(12) United States Patent
Mathison

(10) Patent No.: US 11,350,312 B1
(45) Date of Patent: May 31, 2022

(54) SYSTEMS AND METHODS FOR DYNAMIC RULE DETERMINATION FOR USER PLANE DATA IN A WIRELESS NETWORK

(71) Applicant: Verizon Patent and Licensing Inc., Basking Ridge, NJ (US)

(72) Inventor: James Mathison, Warren, NJ (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 0 days.

(21) Appl. No.: 17/167,785

(22) Filed: Feb. 4, 2021

(51) Int. Cl.
*H04W 28/08* (2009.01)
*H04W 88/16* (2009.01)
*H04W 28/02* (2009.01)

(52) U.S. Cl.
CPC ... *H04W 28/0925* (2020.05); *H04W 28/0268* (2013.01); *H04W 28/0284* (2013.01); *H04W 88/16* (2013.01)

(58) Field of Classification Search
CPC ......... H04W 28/0925; H04W 28/0268; H04W 28/0284; H04L 47/22; H04L 47/20; H04L 12/141
See application file for complete search history.

(56) References Cited

U.S. PATENT DOCUMENTS

| 10,772,005 B2* | 9/2020 | Yan ...................... H04L 47/20 |
| 11,095,559 B1* | 8/2021 | Garvia ................. H04L 45/124 |
| 2021/0360506 A1* | 11/2021 | Yang .................... H04W 40/02 |

FOREIGN PATENT DOCUMENTS

| CN | 112584328 A | * | 3/2021 | |
| CN | 113302880 A | * | 8/2021 | ......... H04L 12/4645 |

OTHER PUBLICATIONS

Ge et al, "Context-Aware Service Chaining Framework for Over-the-Top Applications in 5G Networks", IEEE (Year: 2019).*
Abdulghaffar etal, "Modeling and Evaluation of Software Defined Networking Based 5G Core Network Architecture", IEEE (Year: 2021).*

* cited by examiner

*Primary Examiner* — Omer S Mian

(57) ABSTRACT

A system described herein may identify traffic to be processed by a gateway device. The system may evaluate one or more parameters of the traffic based on a first set of conditions, and identify a first condition that is applicable to the traffic. The system may evaluate, based on identifying the first condition, the one or more parameters based on a second set of conditions and identify a second condition, of the second set of conditions, that is applicable to the traffic. The system may further identify one or more actions to perform with respect to the traffic based on the identified first and second conditions, and instruct the gateway device to perform the one or more actions on the traffic prior to outputting the traffic from the gateway device.

20 Claims, 9 Drawing Sheets

SYSTEMS AND METHODS FOR DYNAMIC RULE DETERMINATION FOR USER PLANE DATA IN A WIRELESS NETWORK

BACKGROUND

Some wireless networks, such as Long-Term Evolution ("LTE") networks, Fifth Generation ("5G") networks, or the like, may include and/or be communicatively coupled to a core network that provides routing, traffic processing, and/or other services for traffic sent and/or received via such wireless networks. Some core networks utilize a Control and User Plane Separation ("CUPS") architecture, in which different network elements handle control plane traffic (e.g., session management, charging operations, etc.) and user plane traffic (e.g., voice traffic, call traffic, etc.).

DETAILED DESCRIPTION OF EXAMPLE EMBODIMENTS

Figure 1:
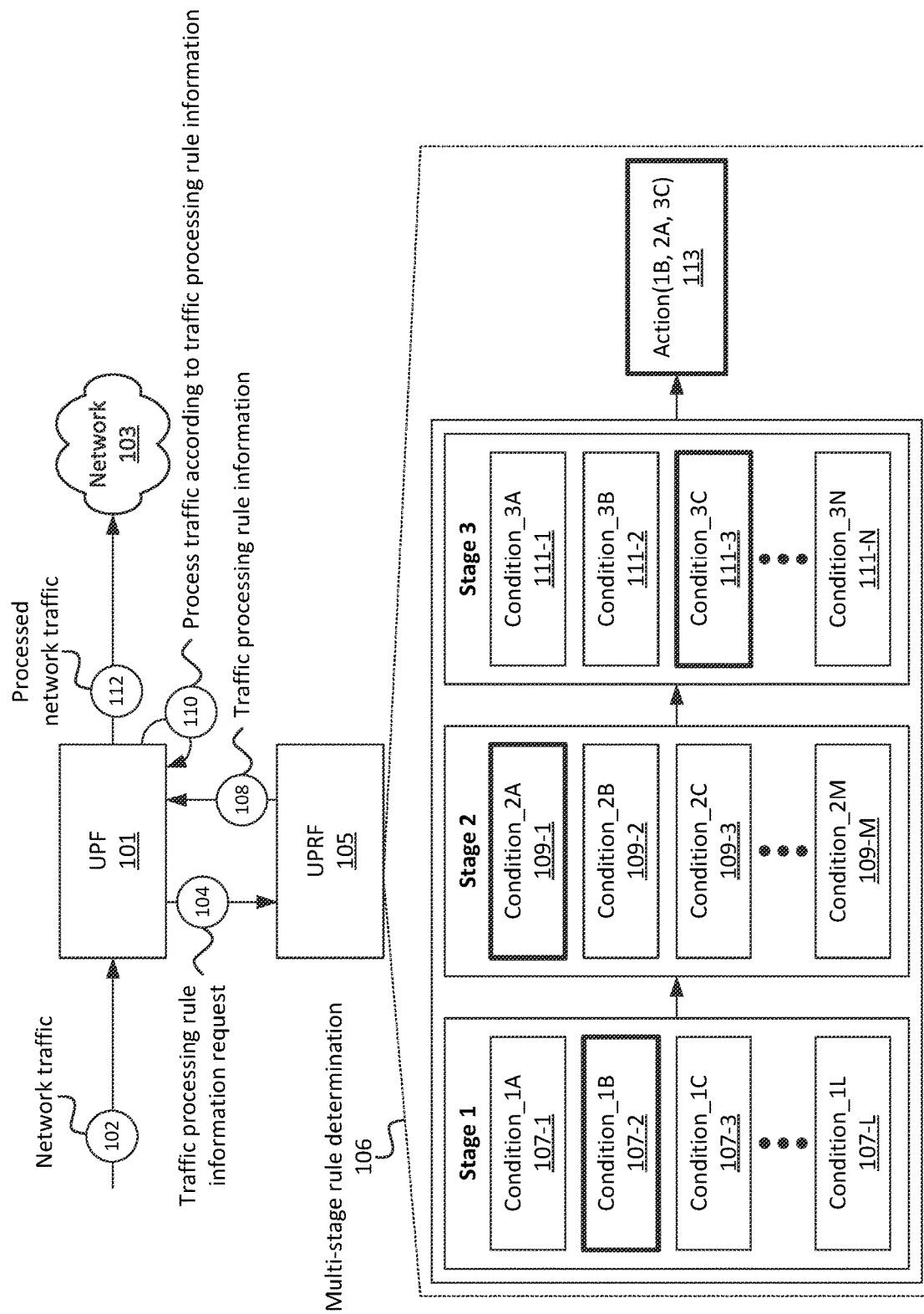
FIG. 1 illustrates an example overview of one or more embodiments described herein.

The following detailed description refers to the accompanying drawings. The same reference numbers in different drawings may identify the same or similar elements.

In a CUPS architecture, network elements that route and/or otherwise process user plane traffic, such as a User Plane Function ("UPF"), a Packet Data Network ("PDN") Gateway-User Plane ("PGW-U"), or the like, may evaluate parameters of the traffic (e.g., source Internet Protocol ("IP") address and/or port, destination IP address and/or port, source and/or destination Uniform Resource Locator ("URL"), Server Name Indicator ("SNI"), application and/or traffic type (e.g., voice, video, video streaming, or the like), and/or other traffic parameters), network parameters (e.g., network load, network performance parameters, etc.), user parameters (e.g., Service Level Agreements ("SLAs"), minimum performance thresholds, etc.), and/or other parameters in order to determine a particular rule to apply to the traffic. A "rule," as referred to herein, may include one or more conditions (e.g., which may be conditions for traffic parameters, network parameters, user parameters, etc.) and one or more actions to perform (e.g., drop traffic, apply particular Quality of Service ("QoS") treatment, etc.) on traffic meeting such conditions. Such rules may be evaluated sequentially and/or in a hierarchical manner, whereby if a set of conditions associated with a given rule is met, evaluation of any other rules may not be performed, and the action(s) associated with the given rule may be performed.

In other words, a UPF, PGW-U, or other device or system evaluating such rules for given user plane traffic may stop evaluating rules once a matching rule is found. In this manner, traffic matching multiple conditions for multiple rules may not be treated as intended, and/or more complex compound rules may need to be installed in order to handle traffic meeting conditions associated with multiple rules. As one example, video traffic (e.g., traffic originating from an IP address associated with a streaming video content provider, traffic that includes header or other information indicating that such traffic is "video" traffic, etc.) may be associated with a rate shaping action that optimizes a bitrate of the traffic based on a target resolution and based on SLAs associated with a given user (e.g., a minimum performance threshold associated with such user or a User Equipment ("UE") associated with the user). As another example, tethered traffic (e.g., traffic sent via a UE that is acting as a "hotspot," in which such UE acts as an access point for other devices via a first radio access technology ("RAT"), such as WiFi, and sends and/or receives data to and/or from a network (e.g., the Internet) via a second RAT, such as a LTE RAT, a 5G RAT, or the like) may be associated with a maximum bitrate. In situations where traffic is both "video" traffic and "tethered" traffic, one of the above rules may be applied, while the other rule is not considered.

In accordance with some embodiments, multiple passes or "stages" of rules may be evaluated in a CUPS environment, such that traffic meeting conditions for multiple rules may be handled in a suitable manner. For instance, in the above example, a different action may be desired for traffic that is both tethered traffic and video traffic. For example, a first maximum and/or minimum bitrate may be used for video traffic that is not tethered traffic, a second maximum and/or minimum bitrate may be used for tethered traffic that is not video traffic, and a third maximum and/or minimum bitrate may be used for traffic that is both tethered traffic and video traffic.

Embodiments described herein may enhance the hierarchical and/or sequential evaluation of rules in a CUPS network environment to include a multi-stage evaluation of conditions, and the determination of suitable actions to perform on traffic based on such hierarchical and/or sequential evaluation. For example, as shown in FIG. 1, UPF 101 may receive (at 102) network traffic. For example, such network traffic may have been received from a particular UE via a radio access network ("RAN") of a wireless network, from an application server, from a Content Delivery Network ("CDN"), from network 103 (e.g., the Internet or some other type of network), and/or some other network. While the examples of FIGS. 1-4 are presented in the context of UPF 101, in practice, the same or similar operations may be performed by a PGW-U and/or some other device or system that handles user plane traffic.

UPF 101 may be communicatively coupled to, may include, may implement, and/or may otherwise communicate with User Plane Rule Function ("UPRF") 105. For example, UPF 101 and UPRF 105 may communicate via an N4 interface, an N9 interface, and/or some other suitable interface. In some embodiments, UPRF 105 may be communicatively coupled to, may include, may implement, and/or may otherwise communicate with a policy and/or rules component of a wireless network, such as a Policy Charging and Rules Function ("PCRF"), a Policy Control Function ("PCF"), or the like, which may maintain, generate, receive, modify, and/or provide some or all of the rules information used by UPRF 105 (e.g., conditions, actions, stages, etc.). In some embodiments, UPRF 105 may communicate with a PCF and/or PCRF via an N7 interface and/or some other suitable interface.

In some embodiments, UPF 101 may request (at 104) rule information for the received traffic. For example, the received traffic may include the first packet for a given flow (e.g., where a particular "flow" is associated with a particular source IP and/or port, a particular destination IP and/or port, and/or other differentiating characteristics), for which UPF 101 has not yet identified traffic processing rules. While not discussed at length here, once UPF 101 determines or receives the appropriate rule(s) for the flow (e.g., as described herein), UPF 101 may apply such rules for traffic associated with the flow, without again requesting (e.g., at 104) rule information from UPRF 105.

As shown, UPRF 105 may perform (at 106) a multi-stage rule determination process in order to identify one or more rules associated with the received network traffic. For example, as discussed below, UPRF 105 may determine one or more conditions met by the network traffic, and one or more actions to perform based on the determination of the one or more conditions. As noted above, the conditions may be evaluated in a multi-stage manner, where each stage may include a single condition. For example, in the CUPS architecture, rules and/or conditions may be hierarchical, in that such conditions may be evaluated based on priority, primacy, importance, etc. Referring to the example of FIG. 1, the first stage may include conditions 107-1 through 107-L, the second stage may include conditions 109-1 through 109-M, and the third stage may include conditions 111-1 through 111-N. In practice, the multi-stage rule determination (at 106) may be performed based on fewer or more stages.

The priority, primacy, etc. of respective conditions may be denoted by the position of the conditions in the figure with respect to other conditions of the same stage. For example, condition 107-1 may have a "higher" priority than condition 107-2, condition 107-3, and condition 107-L. As another example, condition 107-2 may have a higher priority than condition 107-3 and condition 107-L. As such, when evaluating conditions 107 of the first stage, UPRF 105 may first determine whether condition 107-1 is met, may then determine whether condition 107-2 is met (e.g., if condition 107-1 is not met), may then determine whether condition 107-3 is met (e.g., if condition 107-1 and condition 107-2 are not met), and so on.

In this example, UPRF 105 may determine that condition 107-2 is met by the received network traffic. For example, UPRF 105 may determine that condition 107-1 is not met, and based on determining that condition 107-1 is not met, may proceed to evaluate condition 107-2 and determine that condition 107-2 is met. As mentioned above, the "evaluation" of the network traffic may include a comparison of parameters associated with the traffic (e.g., a source of the traffic, a destination of the traffic, header information of the traffic, URL associated with the traffic, SNI, application and/or traffic type, etc.), network parameters (e.g., network load associated with UPF 101 and/or other network elements), and/or other parameters. Such parameters may be determined based on header information in the traffic (e.g., header information indicating traffic and/or application type, source and/or destination IP address, source and/or destination URL, etc.) and/or information from one or more other sources.

Based on determining that condition 107-2 is applicable to the network traffic (e.g., one or more parameters of the traffic and/or other parameters as discussed above satisfy condition 107-2), then UPRF 105 may proceed to the next stage of evaluation (e.g., Stage 2). In this example, UPRF 105 may determine that condition 109-1 is applicable to the network traffic. In some embodiments, based on determining that condition 109-1 is applicable to the network traffic, UPRF 105 may forgo evaluating other conditions 109 of Stage 2 (e.g., conditions 109-2, 109-3, and 109-M). Once UPRF 105 has completed Stage 2 of the multi-stage rule determination (at 106), UPRF 105 may proceed to Stage 3. In this example, UPRF 105 may determine that condition 111-1 does not apply to the traffic, may then determine that condition 111-2 does not apply to the traffic, and may then determine that condition 111-3 applies to the traffic.

Once UPRF 105 has concluded the multi-stage evaluation of conditions that are applicable to the received traffic, the multi-stage rule determination (at 106) may further include the determination of an action that is associated with the identified conditions. For example, UPRF 105 may select, generate, and/or otherwise determine action 113 based on the identified conditions 107-2, 109-1, and 111-3. Action 113 may be selected, for example, from a pool of candidate actions that are each associated with respective combinations of conditions (e.g., action 113 may be a first action associated with the satisfaction of conditions 107-2, 109-1, and 111-3, while another candidate action may be a second action associated with the satisfaction of conditions 107-1, 109-1, and 111-1, and so on). In some embodiments, the same action (e.g., action 113 or another action) may be associated with multiple sets of combinations of conditions. For example, in some embodiments, action 113 may be selected when conditions 107-2, 109-1, and 111-3 are satisfied, when conditions 107-1, 109-1, and 111-1 are satisfied, and so on.

In some embodiments, as discussed below, one or more stages may be associated with output parameters that may be used at subsequent stages (e.g., where such output parameters may be used as further parameters based on which conditions 109, 111, etc. may be determined) and/or in the selection of a particular action (e.g., action 113). Additionally, or alternatively, such output parameters may be used to affect parameters of the selected action, while the action itself may be the same. For example, one instance of action 113 may include an enforcement of a maximum bitrate, where one set of output parameters used for action 113 may be a first maximum bitrate (e.g., 1.3 MB/s) while a second set of output parameters used for action 113 may be a second maximum bitrate (e.g., 2.1 MB/s).

In some embodiments, action 113 may be selected using artificial intelligence/machine learning ("AI/ML") techniques or other suitable techniques. For example, UPRF 105 may use K-means clustering, neural networks, deep learning, user-provided feedback, classification, and/or other suitable techniques to identify particular actions that are appropriate for particular sets of conditions, parameters, etc. For example, UPRF 105 may utilize models, training procedures, simulations, feedback, reinforcement learning, and/or other suitable techniques to identify whether a given action should be associated with the satisfaction of a given condition or set of conditions. Such association may be determined for an action that increases yield with respect to a given set of conditions (e.g., a greater increase in yield than other actions), where "yield" may be reflected by particular metrics such as latency, throughput, and/or other suitable metrics.

Once UPRF 105 has completed the multi-stage rule determination (at 106) and has selected particular action 113, UPRF 105 may provide (at 108) the determined rule information (e.g., action 113) to UPF 101. In some embodiments, UPF 101 may install, store, maintain, etc. action 113 and may determine that action 113 is applicable to subsequent traffic having the same attributes or parameters (e.g., source, destination, etc.) as the received (at 102) network traffic. UPF 101 may also process (at 110) the traffic according to the received rule information. For example, UPF 101 may perform (at 110) action 113 on the received traffic, which may include dropping the traffic, applying particular QoS treatment to the traffic (e.g., placing the traffic in a particular egress queue, where different egress queues may be associated with different QoS levels and/or may otherwise be prioritized in a differentiated manner), performing content filtering (e.g., examining a header and/or payload of the traffic and dropping the traffic if the header and/or payload contains particular information or types of information, such as adult content, illegal content, etc.), redirecting the traffic (e.g., forwarded to a destination other than a destination indicated in the traffic itself), specifying a rating group or service identifier (e.g., where such rating group or service identifier may be used by a charging system, such as an Online Charging System ("OCS"), Charging Function ("CHF"), or the like to determine an amount of usage for a given UE and/or rating group or service identifier), and/or performing other suitable actions.

UPF 101 may proceed to output (at 112) the processed network traffic toward its intended destination (e.g., as indicated by a destination IP address/port or other suitable indicator) via network 103. While the traffic is shown as being output (at 112), in some situations, as noted above, traffic may be dropped, rejected, etc. instead of being output to network 103.

Figure 2:
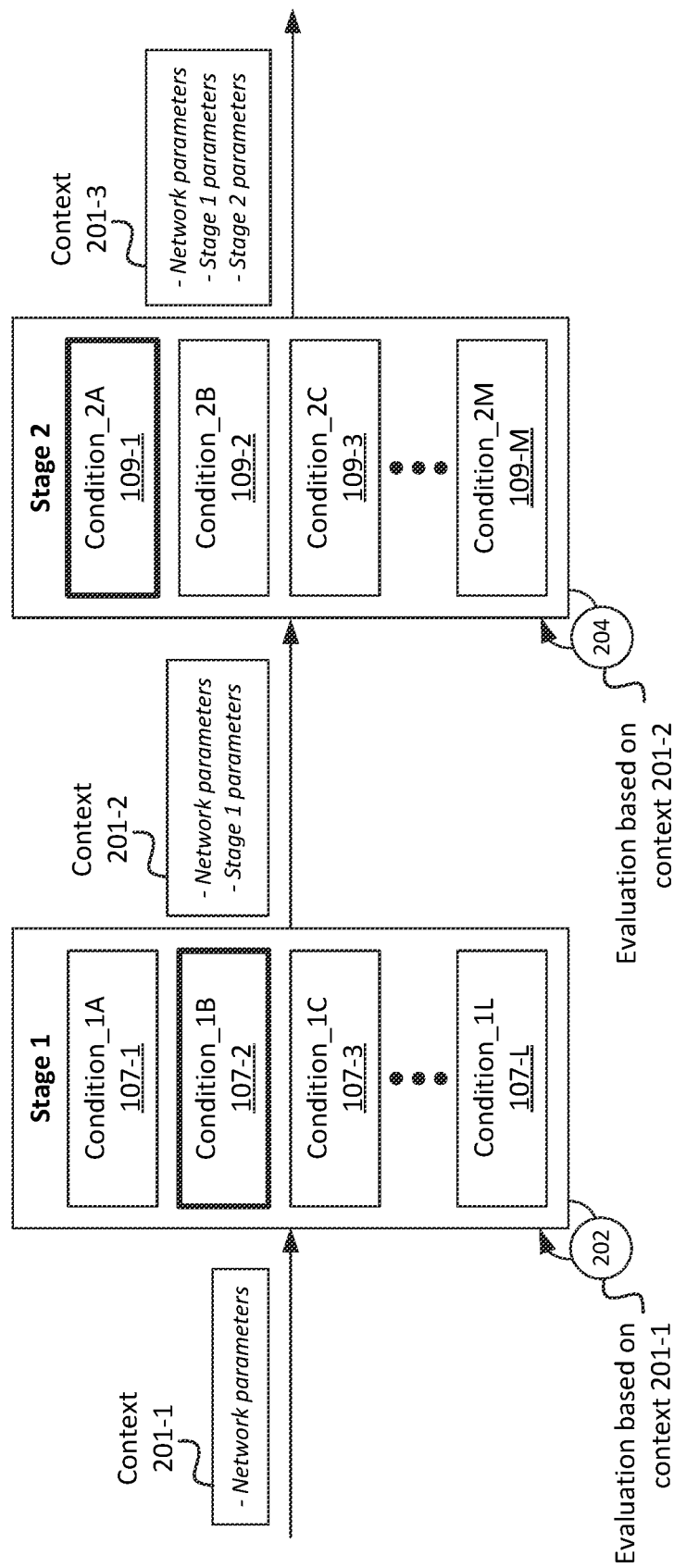
FIGS. 2 and 3 illustrate an example of hierarchical rule determination in a wireless network based on a multi-stage context, in accordance with some embodiments.

As discussed above, one or more stages of the multi-stage rule determination (at 106) may include the determination of parameters at various stages. In this manner, a particular rule context may be used with respect to the multi-stage rule determination. For example, as shown, context 201 may be associated with a given multi-stage rule determination procedure for particular network traffic. In the example of FIG. 2, context 201-1 may refer to a state of context 201 prior to evaluation of Stage 1 conditions 107, context 201-2 may refer to a state of context 201 after evaluation of Stage 1 conditions 107 and prior to evaluation of Stage 2 conditions 109, and context 201-3 may refer to a state of context 201 after evaluation of Stage 1 conditions 107 and Stage 2 conditions 109.

As shown, prior to the evaluation of Stage 1 conditions 107, context 201-1 may include network parameters. As mentioned above, network parameters may include parameters related to network load (e.g., processing and/or network capacity and/or utilization of UPF 101 and/or other network devices or systems). While network parameters are referred to in this example, in practice, context 201 may include other parameters, such as user parameters (e.g., SLAs and/or other information associated with a device or system from which the traffic was received, SLAs and/or other information associated with a device or system for which the traffic is destined, etc.) and/or other suitable information.

As shown, UPRF 105 may evaluate (at 202) conditions 107 of Stage 1 based on context 201-1 (e.g., based on the network parameters indicated in context 201-1). In this example, UPRF 105 may select (at 202) condition 107-2 based on context 201-1. In some embodiments, the selection of condition 107-2 may include the addition of one or more output parameters for context 201. For example, as shown, context 201-2 may include output parameters associated with Stage 1 (shown as "Stage 1 parameters"). In some embodiments, context 201-2 may include an identifier or other indicator of which particular condition was identified at Stage 1 (e.g., an indicator of condition 107-2, such as a name (e.g., "Condition_1B") or other indicator).

In some embodiments, one or more conditions may be associated with a computation, look-up table, processing, or other type of operation, based on which output parameters may be generated or determined. For example, the identification or determination of condition 107-2 at Stage 1 may include the generation of output parameters that include a score, a value, etc. generated based on the network parameters and one or more operations specified by or otherwise associated with condition 107-2.

As one example, the network parameters indicated by context 201-1 may include an indication that a source of the traffic is a particular streaming video content provider, and that UPF 101 is experiencing relatively heavy load (e.g., an amount or rate of traffic that exceeds a threshold). In this example, condition 107-2 may be selected based on context 201-1 (e.g., based on the source of the traffic being the particular streaming video content provider, and further based on UPF 101 experiencing relatively heavy load), and the output parameters associated with condition 107-2 may include a maximum bitrate. Thus, context 201-2 may include the indication that the source of the traffic is the particular streaming video content provider, the indication that UPF 101 is experiencing relatively heavy load, and the maximum bitrate computed or determined at Stage 1.

UPRF 105 may further evaluate (at 204) Stage 2 conditions 109 based on context 201-2 (e.g., based on the network parameters and/or the Stage 1 output parameters). For example, UPRF 105 may select condition 109-1 based on such parameters, including the output parameters of Stage 1, indicating the maximum bitrate. In an alternate example, given a different context (e.g., given the same network parameters but different output parameters from Stage 1, such as a different maximum bitrate or no maximum bitrate), UPRF 105 may have selected a different condition 109 at Stage 2. The output of Stage 2 may include context 201-3, which may include the original network parameters, output parameters of Stage 1, output parameters of Stage 2, etc.

In some embodiments, the evaluation at a subsequent stage may include a modification of the output parameters of a previous stage. For example, the selection of condition 109-1 may include weighting or further modifying the maximum bitrate specified in Stage 1. As another example, the selection of condition 109-1 may include the selection or computation of a minimum bitrate (e.g., where the minimum bitrate may be selected based on the maximum bitrate specified in Stage 1). While some examples of output parameters and/or computations that may be performed at various stages (e.g., in accordance with operations specified by certain conditions), in practice, other types of output parameters and/or computations are possible.

Figure 3:
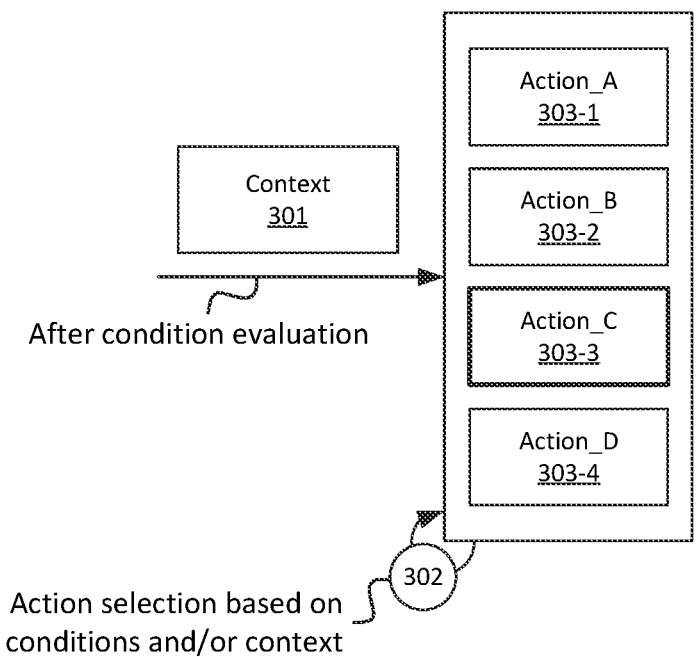

As shown in FIG. 3, based on context 301 (e.g., a context after all stages of conditions have been evaluated), UPRF 105 may select (at 302) an action 303 to take with respect to particular network traffic. For example, as discussed above, each respective action 303 may be associated with a particular combination of conditions, a particular set or combination of output parameters, particular network parameters, and/or other criteria based on which a particular action 303 may be selected. As additionally noted above, AI/ML techniques or other suitable techniques may be used to associate and/or determine particular actions 303 based on certain parameters (e.g., network parameters, output parameters, etc.). As also discussed above, actions 303 may include traffic-related operations, such as adding traffic, applying QoS treatment to traffic, forwarding traffic to different destinations, and/or other suitable operations. In the example shown here, UPRF 105 may select action 303-3 from a set of candidate actions that includes actions 303-1 through 303-4. As noted above, UPRF 105 may indicate (e.g., at 108) the selected action 303-3 to UPF 101, which may associate action 303-3 with a traffic flow associated with the received traffic (e.g., where such traffic flow is identified or indicated by a source and/or destination of the traffic, and/or other identifiable attributes of the traffic).

Figure 4:
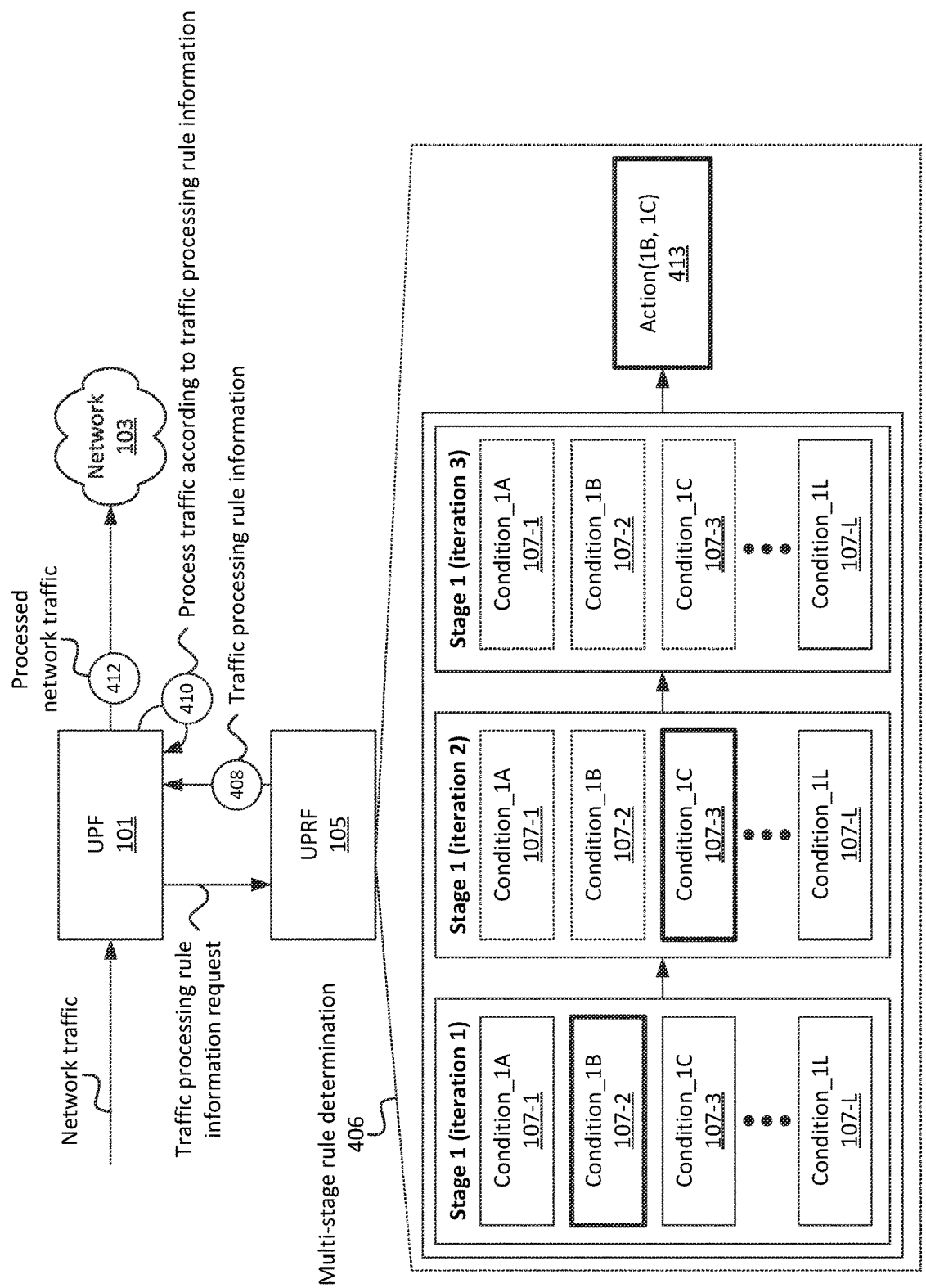
FIG. 4 illustrates an example hierarchical rule determination in a wireless network based on multiple iterations of a particular stage in rule hierarchy, in accordance with some embodiments.

In some embodiments, the multi-stage rule determination performed by UPRF 105 may include multiple iterations of the same stage. For example, as shown in FIG. 4, multi-stage rule determination (at 406) may include multiple iterations of one particular stage (e.g., Stage 1, in this example). As shown, for example, in a first iteration, UPRF 105 may evaluate conditions of Stage 1 sequentially. For example, UPRF 105 may evaluate condition 107-1, determine that condition 107-1 does not apply, and accordingly evaluate the parameters of the network traffic against condition 107-2. In this example, UPRF 105 may determine that condition 107-2 is applicable to the network traffic. In some embodiments, UPRF 105 may proceed with a second iteration of Stage 1. For example, an output parameter of the first Stage 1 (e.g., an output parameter associated with condition 107-2) may indicate that Stage 1 should be evaluated again. In some embodiments, the output parameter of Stage 1 may include an "Exit" parameter, such as an indicator of a quantity of times that Stage 1 should be evaluated. Additionally, or alternatively, the output parameter of Stage 1 may not include an "Exit" parameter (or other similar parameter), indicating that a subsequent stage should be evaluated. In such embodiments, UPRF 105 may perform multiple iterations of the same stage until none of the conditions of the stage are applicable, and/or may otherwise determine a quantity of iterations of the same stage to perform.

As further shown, UPRF 105 may proceed with a second iteration of Stage 1. In some embodiments, as conditions 107-1 and 107-2 have already been evaluated in the first iteration (as denoted in the figure by the dashed lines), UPRF 105 may forgo evaluating these conditions 107-1 and 107-2 in the second iteration. In this example, on the second iteration of Stage 1, UPRF 105 may determine that condition 107-3 is applicable (e.g., in view of the network parameters associated with the traffic and/or any suitable output parameters of the first iteration of Stage 1).

As further shown, UPRF 105 may proceed with a third iteration of Stage 1. As denoted by the dashed lines in the third iteration of Stage 1, UPRF 105 may forgo evaluating conditions 107-1 through 107-3, as such conditions have already been evaluated in prior iterations. In this example, UPRF 105 may determine that none of the remaining conditions of Stage 1 (e.g., other than conditions 107-2 and 107-3) are applicable to the traffic. In some embodiments, based on the determination that none of the remaining conditions of Stage 1 are met, UPRF 105 may proceed to determine action 413 based on selected conditions 107-2 and 107-3 (and/or any applicable parameters, such as output parameters associated with conditions 107-2 and/or 107-3).

In some embodiments, although not explicitly shown in this figure, UPRF 105 may proceed to a subsequent stage after evaluating multiple iterations of Stage 1. For example, UPRF 105 may evaluate Stage 2 conditions (e.g., in one iteration or multiple iterations) after completing the evaluation of Stage 1. In some embodiments, as noted above, UPRF 105 may evaluate a given stage up to a maximum threshold quantity of times, and may proceed with evaluating a subsequent stage and/or selecting an action after the given stage has been evaluated the threshold quantity of times (or after determining that no conditions associated with the stage are applicable, even if the stage has not been evaluated the threshold quantity of times).

As similarly discussed above with respect to FIG. 1, UPRF 105 may output (at 408) information indicating the selected action 413, UPF 101 may process (at 410) the received traffic according to the action, and may output (at 412) the processed network traffic to its destination via network 103.

Figure 5:
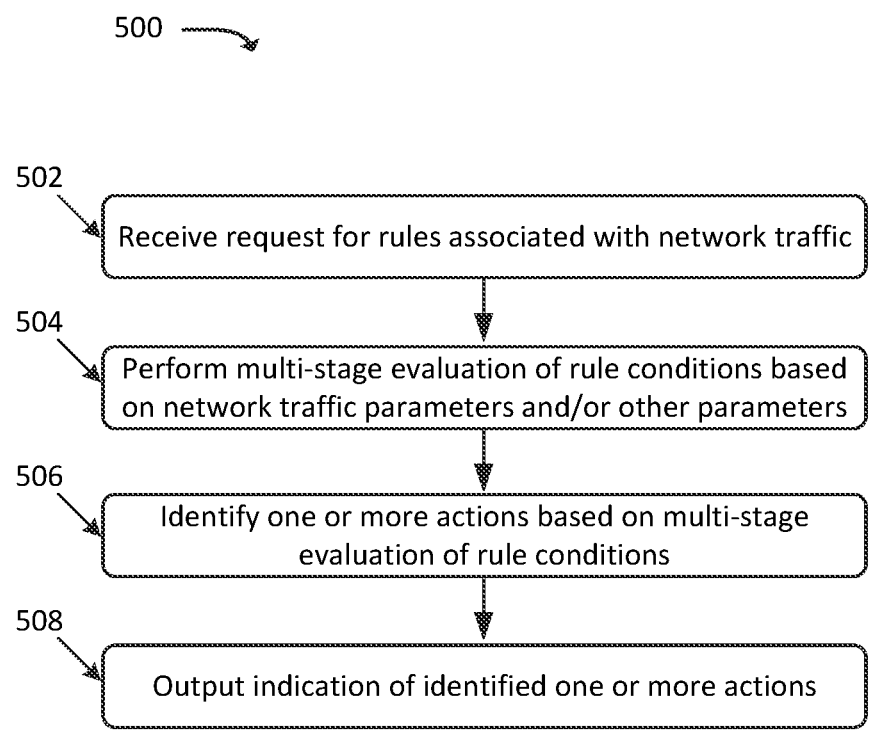
FIG. 5 illustrates an example process for a multi-stage rule determination in a wireless network, in accordance with some embodiments.

FIG. 5 illustrates an example process 500 for a multi-stage rule determination in a wireless network, in accordance with some embodiments. In some embodiments, some or all of process 500 may be performed by UPRF 105. In some embodiments, one or more other devices may perform some or all of process 500 (e.g., in concert with, and/or in lieu of, UPRF 105).

As shown, process 500 may include receiving (at 502) a request for rules associated with network traffic. For example, as discussed above, UPRF 105 may receive (e.g., from UPF 101) a request for rules and/or actions with respect to particular network traffic. As noted above, such request may include traffic parameters (e.g., a source and/or destination associated with the traffic, a type of traffic, and/or other parameters), network parameters (e.g., a measure of load associated with UPF 101 and/or other network elements, performance metrics associated with UPF 101 and/or other network elements, and/or other network parameters), and/or other parameters.

Process 500 may further include performing (at 504) a multi-stage rule determination associated with the network traffic. For example, as discussed above, UPRF 105 may evaluate the network parameters against various conditions. Such conditions may be evaluated in a particular order, which may be based on priority levels associated with such conditions. In some embodiments, a particular stage may be complete when a particular condition associated with the stage is met. That is, in some embodiments, once a particular condition for a stage is satisfied, no other conditions (e.g., with lower priority) may be evaluated for that stage. In some embodiments, as discussed above, the same stage may be evaluated iteratively, multiple times. As further discussed above, one or more conditions or stages may be associated with output parameters, which may be used in the selection of subsequent conditions and/or actions.

Process 500 may additionally include identifying (at 506) an action, or set of actions, based on the multi-stage rule determination. For example, certain actions may be associated with particular combinations of conditions and/or parameters, which may have been determined as part of the multi-stage rule determination (at 504).

Process 500 may also include outputting (at 508) the identified action, or set of actions. For example, UPRF 105 may output such information to UPF 101 and/or some other suitable device or system, which may proceed to execute the actions on the network traffic. In some embodiments, for subsequent traffic matching the same parameters (e.g., the same source and/or destination or other parameters), UPF 101 may forgo requesting (at 502) rule information for such traffic, and may instead use the previously provided (at 508) action or set of actions for such subsequent traffic.

Figure 6:
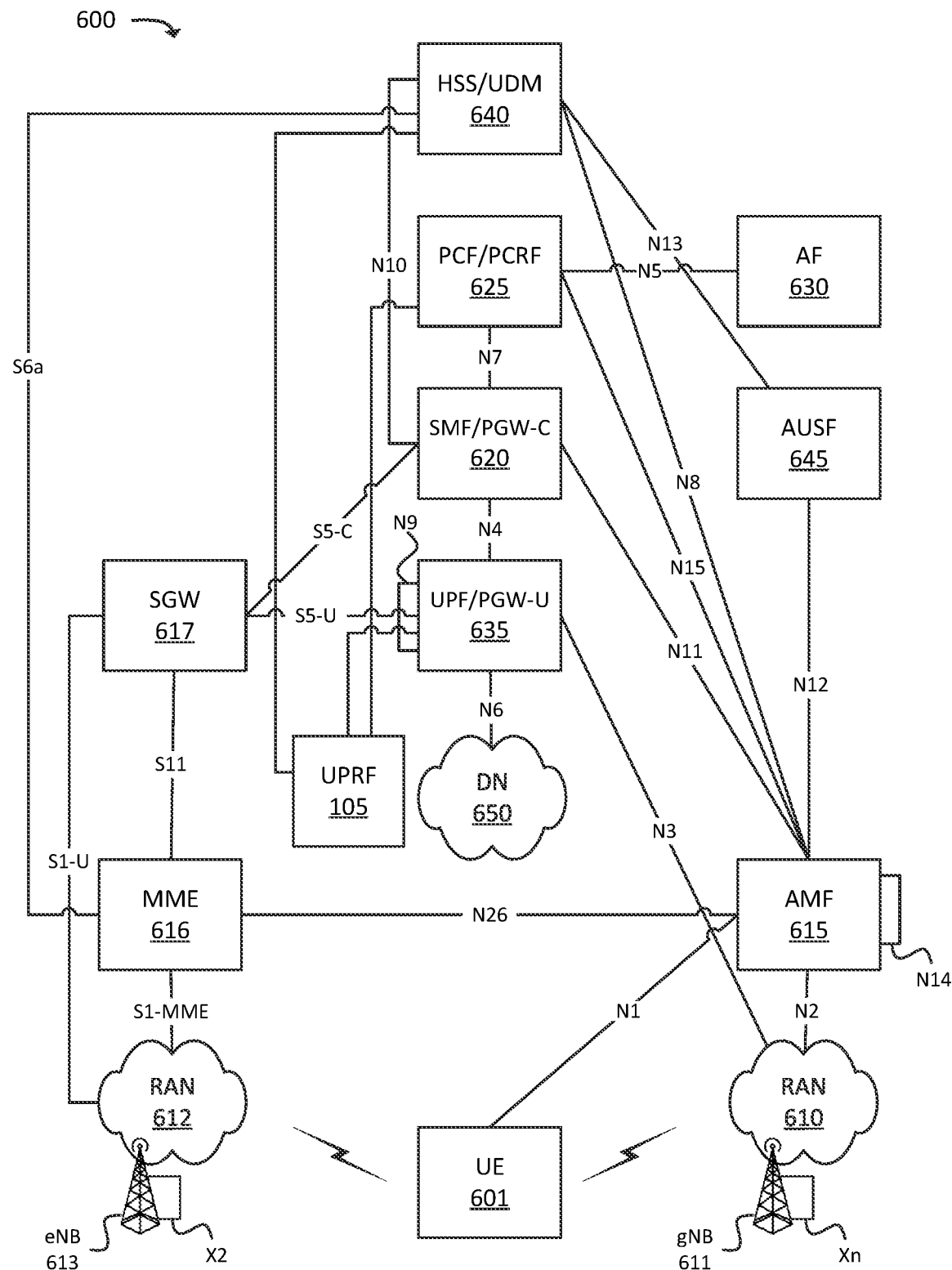
FIG. 6 illustrates an example environment in which one or more embodiments, described herein, may be implemented.

FIG. 6 illustrates an example environment 600, in which one or more embodiments may be implemented. In some embodiments, environment 600 may correspond to a Fifth Generation ("5G") network, and/or may include elements of a 5G network. In some embodiments, environment 600 may correspond to a 5G Non-Standalone ("NSA") architecture, in which a 5G radio access technology ("RAT") may be used in conjunction with one or more other RATs (e.g., a Long-Term Evolution ("LTE") RAT), and/or in which elements of a 5G core network may be implemented by, may be communicatively coupled with, and/or may include elements of another type of core network (e.g., an evolved packet core ("EPC")). As shown, environment 600 may include UE 601, RAN 610 (which may include one or more Next Generation Node Bs ("gNBs") 611), RAN 612 (which may include one or more one or more evolved Node Bs ("eNBs") 613), and various network functions such as Access and Mobility Management Function ("AMF") 615, Mobility Management Entity ("MME") 616, Serving Gateway ("SGW") 617, Session Management Function ("SMF")/PGW-Control Plane function ("PGW-C") 620, PCF/PCRF 625, Application Function ("AF") 630, UPF/PGW-U 635, Home Subscriber Server ("HSS")/Unified Data Management ("UDM") 640, and Authentication Server Function ("AUSF") 645. Environment 600 may also include one or more networks, such as Data Network ("DN") 650. Environment 600 may include one or more additional devices or systems communicatively coupled to one or more networks (e.g., DN 650), such as UPRF 105.

The example shown in FIG. 6 illustrates one instance of each network component or function (e.g., one instance of SMF/PGW-C 620, PCF/PCRF 625, UPF/PGW-U 635, HSS/UDM 640, and/or 645). In practice, environment 600 may include multiple instances of such components or functions. For example, in some embodiments, environment 600 may include multiple "slices" of a core network, where each slice includes a discrete set of network functions (e.g., one slice may include a first instance of SMF/PGW-C 620, PCF/PCRF 625, UPF/PGW-U 635, HSS/UDM 640, and/or 645, while another slice may include a second instance of SMF/PGW-C 620, PCF/PCRF 625, UPF/PGW-U 635, HSS/UDM 640, and/or 645). The different slices may provide differentiated levels of service, such as service in accordance with different QoS parameters.

The quantity of devices and/or networks, illustrated in FIG. 6, is provided for explanatory purposes only. In practice, environment 600 may include additional devices and/or networks, fewer devices and/or networks, different devices and/or networks, or differently arranged devices and/or networks than illustrated in FIG. 6. For example, while not shown, environment 600 may include devices that facilitate or enable communication between various components shown in environment 600, such as routers, modems, gateways, switches, hubs, etc. Alternatively, or additionally, one or more of the devices of environment 600 may perform one or more network functions described as being performed by another one or more of the devices of environment 600. Devices of environment 600 may interconnect with each other and/or other devices via wired connections, wireless connections, or a combination of wired and wireless connections. In some implementations, one or more devices of environment 600 may be physically integrated in, and/or may be physically attached to, one or more other devices of environment 600.

UE 601 may include a computation and communication device, such as a wireless mobile communication device that is capable of communicating with RAN 610, RAN 612, and/or DN 650. UE 601 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an IoT device (e.g., a sensor, a smart home appliance, or the like), a wearable device, an Internet of Things ("IoT") device, a Machine-to-Machine ("M2M") device, or another type of mobile computation and communication device. UE 601 may send traffic to and/or receive traffic (e.g., user plane traffic) from DN 650 via RAN 610, RAN 612, and/or UPF/PGW-U 635.

RAN 610 may be, or may include, a 5G RAN that includes one or more base stations (e.g., one or more gNBs 611), via which UE 601 may communicate with one or more other elements of environment 600. UE 601 may communicate with RAN 610 via an air interface (e.g., as provided by gNB 611). For instance, RAN 610 may receive traffic (e.g., voice call traffic, data traffic, messaging traffic, signaling traffic, etc.) from UE 601 via the air interface, and may communicate the traffic to UPF/PGW-U 635, and/or one or more other devices or networks. Similarly, RAN 610 may receive traffic intended for UE 601 (e.g., from UPF/PGW-U 635, AMF 615, and/or one or more other devices or networks) and may communicate the traffic to UE 601 via the air interface.

RAN 612 may be, or may include, a LTE RAN that includes one or more base stations (e.g., one or more eNBs 613), via which UE 601 may communicate with one or more other elements of environment 600. UE 601 may communicate with RAN 612 via an air interface (e.g., as provided by eNB 613). For instance, RAN 610 may receive traffic (e.g., voice call traffic, data traffic, messaging traffic, signaling traffic, etc.) from UE 601 via the air interface, and may communicate the traffic to UPF/PGW-U 635, and/or one or more other devices or networks. Similarly, RAN 610 may receive traffic intended for UE 601 (e.g., from UPF/PGW-U 635, SGW 617, and/or one or more other devices or networks) and may communicate the traffic to UE 601 via the air interface.

AMF 615 may include one or more devices, systems, Virtualized Network Functions ("VNFs"), etc., that perform operations to register UE 601 with the 5G network, to establish bearer channels associated with a session with UE 601, to hand off UE 601 from the 5G network to another network, to hand off UE 601 from the other network to the 5G network, manage mobility of UE 601 between RANs 610 and/or gNBs 611, and/or to perform other operations. In some embodiments, the 5G network may include multiple AMFs 615, which communicate with each other via the N14 interface (denoted in FIG. 6 by the line marked "N14" originating and terminating at AMF 615).

MME 616 may include one or more devices, systems, VNFs, etc., that perform operations to register UE 601 with the EPC, to establish bearer channels associated with a session with UE 601, to hand off UE 601 from the EPC to another network, to hand off UE 601 from another network to the EPC, manage mobility of UE 601 between RANs 612 and/or eNBs 613, and/or to perform other operations.

SGW 617 may include one or more devices, systems, VNFs, etc., that aggregate traffic received from one or more eNBs 613 and send the aggregated traffic to an external network or device via UPF/PGW-U 635. Additionally, SGW 617 may aggregate traffic received from one or more UPF/PGW-Us 635 and may send the aggregated traffic to one or more eNBs 613. SGW 617 may operate as an anchor for the user plane during inter-eNB handovers and as an anchor for mobility between different telecommunication networks or RANs (e.g., RANs 610 and 612).

SMF/PGW-C 620 may include one or more devices, systems, VNFs, etc., that gather, process, store, and/or provide information in a manner described herein. SMF/PGW-C 620 may, for example, facilitate in the establishment of communication sessions on behalf of UE 601. In some embodiments, the establishment of communications sessions may be performed in accordance with one or more policies provided by PCF/PCRF 625.

PCF/PCRF 625 may include one or more devices, systems, VNFs, etc., that aggregate information to and from the 5G network and/or other sources. PCF/PCRF 625 may receive information regarding policies and/or subscriptions from one or more sources, such as subscriber databases and/or from one or more users (such as, for example, an administrator associated with PCF/PCRF 625).

AF 630 may include one or more devices, systems, VNFs, etc., that receive, store, and/or provide information that may be used in determining parameters (e.g., quality of service parameters, charging parameters, or the like) for certain applications.

UPF/PGW-U 635 may include one or more devices, systems, VNFs, etc., that receive, store, and/or provide data (e.g., user plane data). For example, UPF/PGW-U 635 may receive user plane data (e.g., voice call traffic, data traffic, etc.), destined for UE 601, from DN 650, and may forward the user plane data toward UE 601 (e.g., via RAN 610, SMF/PGW-C 620, and/or one or more other devices). In some embodiments, multiple UPFs 635 may be deployed (e.g., in different geographical locations), and the delivery of content to UE 601 may be coordinated via the N9 interface (e.g., as denoted in FIG. 6 by the line marked "N9" originating and terminating at UPF/PGW-U 635). Similarly, UPF/PGW-U 635 may receive traffic from UE 601 (e.g., via RAN 610, SMF/PGW-C 620, and/or one or more other devices), and may forward the traffic toward DN 650. In some embodiments, UPF/PGW-U 635 may communicate (e.g., via the N4 interface) with SMF/PGW-C 620, regarding user plane data processed by UPF/PGW-U 635. In some embodiments, UPF 101 may be an instance of UPF/PGW-U 635, and/or may be implemented by UPF/PGW-U 635. Additionally, or alternatively, UPF/PGW-U 635 may be an instance of UPF 101, and/or may be implemented by UPF 101.

HSS/UDM 640 and AUSF 645 may include one or more devices, systems, VNFs, etc., that manage, update, and/or store, in one or more memory devices associated with AUSF 645 and/or HSS/UDM 640, profile information associated with a subscriber. AUSF 645 and/or HSS/UDM 640 may perform authentication, authorization, and/or accounting operations associated with the subscriber and/or a communication session with UE 601.

DN 650 may include one or more wired and/or wireless networks. For example, DN 650 may include an Internet Protocol ("IP")-based PDN, a wide area network ("WAN") such as the Internet, a private enterprise network, and/or one or more other networks. UE 601 may communicate, through DN 650, with data servers, other UEs 601, and/or to other servers or applications that are coupled to DN 650. DN 650 may be connected to one or more other networks, such as a public switched telephone network ("PSTN"), a public land mobile network ("PLMN"), and/or another network. DN 650 may be connected to one or more devices, such as content providers, applications, web servers, and/or other devices, with which UE 601 may communicate.

UPRF 105 may include one or more devices, systems, VNFs, etc. that perform one or more operations described herein. For example, UPRF 105 may perform a multi-stage rule determination for network traffic to be processed by UPF/PGW-U 635, as described above. In some embodiments, UPRF 105 may receive rule information (e.g., conditions, stages, actions, etc.) from SMF/PGW-C 620, PCF/PCRF 625, and/or some other suitable device or system. In some embodiments, UPRF 105 may receive user parameters from HSS/UDM 640 and/or some other suitable device or system. In some embodiments, UPF/PGW-U 635 and UPRF 105 may be implemented by the same device or system. Additionally, or alternatively, UPRF 105 and SMF/PGW-C 620 may be implemented by the same device or system.

Figure 7:
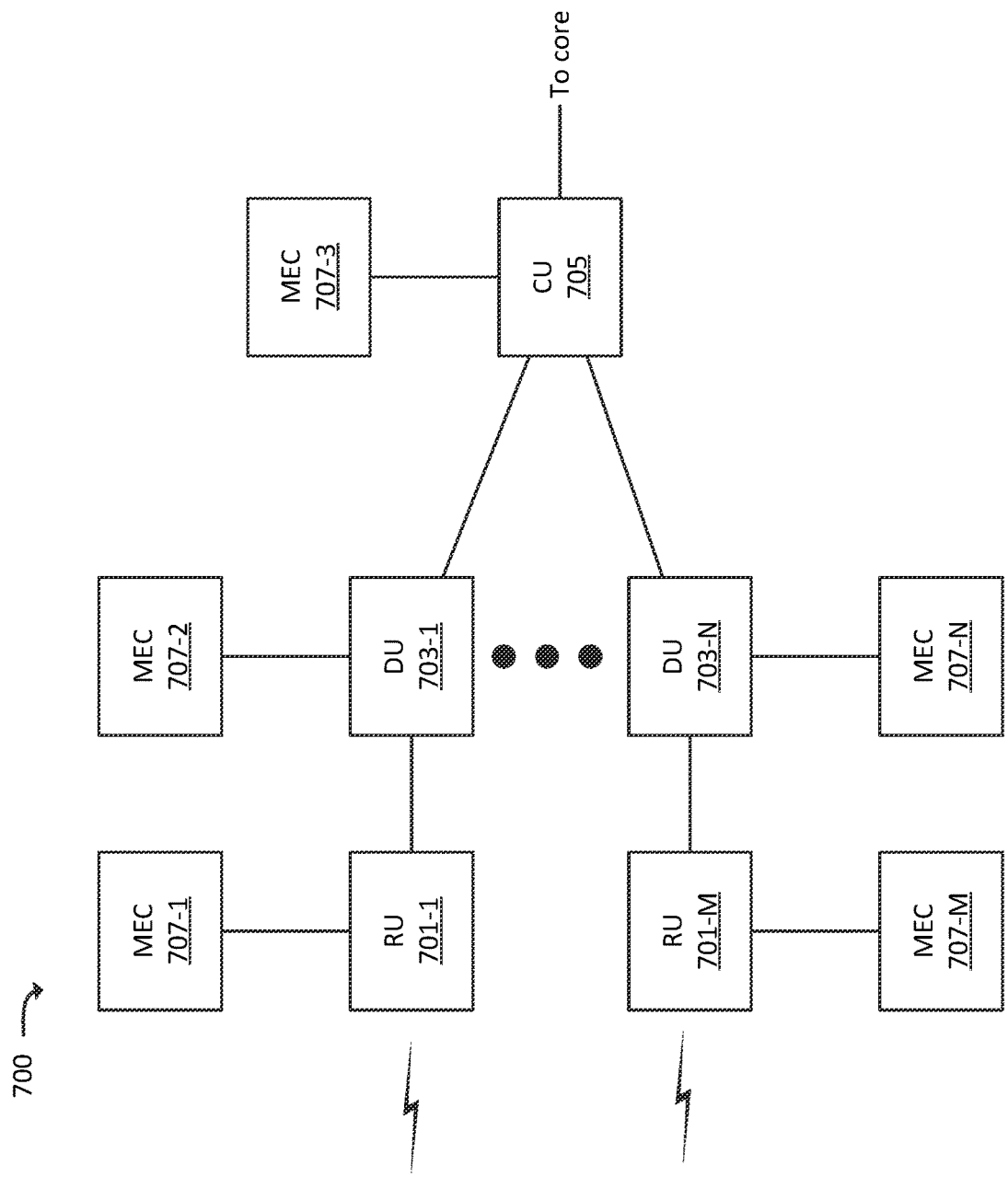
FIG. 7 illustrates an example arrangement of a radio access network ("RAN"), in accordance with some embodiments.

FIG. 7 illustrates an example Distributed Unit ("DU") network 700, which may be included in and/or implemented by one or more RANs (e.g., RAN 610, RAN 612, or some other RAN). In some embodiments, a particular RAN may include one DU network 700. In some embodiments, a particular RAN may include multiple DU networks 700. In some embodiments, DU network 700 may correspond to a particular gNB 611 of a 5G RAN (e.g., RAN 610). In some embodiments, DU network 700 may correspond to multiple gNBs 611. In some embodiments, DU network 700 may correspond to one or more other types of base stations of one or more other types of RANs. As shown, DU network 700 may include Central Unit ("CU") 705, one or more Distributed Units ("DUs") 703-1 through 703-N (referred to individually as "DU 703," or collectively as "DUs 703"), and one or more Radio Units ("RUs") 701-1 through 701-M (referred to individually as "RU 701," or collectively as "RUs 701").

CU 705 may communicate with a core of a wireless network (e.g., may communicate with one or more of the devices or systems described above with respect to FIG. 6, such as AMF 615 and/or UPF/PGW-U 635). In the uplink direction (e.g., for traffic from UEs 601 to a core network), CU 705 may aggregate traffic from DUs 703, and forward the aggregated traffic to the core network. In some embodiments, CU 705 may receive traffic according to a given protocol (e.g., Radio Link Control ("RLC")) from DUs 703, and may perform higher-layer processing (e.g., may aggregate/process RLC packets and generate Packet Data Convergence Protocol ("PDCP") packets based on the RLC packets) on the traffic received from DUs 703.

In accordance with some embodiments, CU 705 may receive downlink traffic (e.g., traffic from the core network) for a particular UE 601, and may determine which DU(s) 703 should receive the downlink traffic. DU 703 may include one or more devices that transmit traffic between a core network (e.g., via CU 705) and UE 601 (e.g., via a respective RU 701). DU 703 may, for example, receive traffic from RU 701 at a first layer (e.g., physical ("PHY") layer traffic, or lower PHY layer traffic), and may process/aggregate the traffic to a second layer (e.g., upper PHY and/or RLC). DU 703 may receive traffic from CU 705 at the second layer, may process the traffic to the first layer, and provide the processed traffic to a respective RU 701 for transmission to UE 601.

RU 701 may include hardware circuitry (e.g., one or more RF transceivers, antennas, radios, and/or other suitable hardware) to communicate wirelessly (e.g., via an RF interface) with one or more UEs 601, one or more other DUs 703 (e.g., via RUs 701 associated with DUs 703), and/or any other suitable type of device. In the uplink direction, RU 701 may receive traffic from UE 601 and/or another DU 703 via the RF interface and may provide the traffic to DU 703. In the downlink direction, RU 701 may receive traffic from DU 703, and may provide the traffic to UE 601 and/or another DU 703.

RUs 701 may, in some embodiments, be communicatively coupled to one or more Multi-Access/Mobile Edge Computing ("MEC") devices, referred to sometimes herein simply as "MECs" 707. For example, RU 701-1 may be communicatively coupled to MEC 707-1, RU 701-M may be communicatively coupled to MEC 707-M, DU 703-1 may be communicatively coupled to MEC 707-2, DU 703-N may be communicatively coupled to MEC 707-N, CU 705 may be communicatively coupled to MEC 707-3, and so on. MECs 707 may include hardware resources (e.g., configurable or provisionable hardware resources) that may be configured to provide services and/or otherwise process traffic to and/or from UE 601, via a respective RU 701.

For example, RU 701-1 may route some traffic, from UE 601, to MEC 707-1 instead of to a core network (e.g., via DU 703 and CU 705). MEC 707-1 may process the traffic, perform one or more computations based on the received traffic, and may provide traffic to UE 601 via RU 701-1. In this manner, ultra-low latency services may be provided to UE 601, as traffic does not need to traverse DU 703, CU 705, and an intervening backhaul network between DU network 700 and the core network. In some embodiments, MEC 707 may include, and/or may implement, some or all of the functionality described above with respect to UPRF 105.

Figure 8:
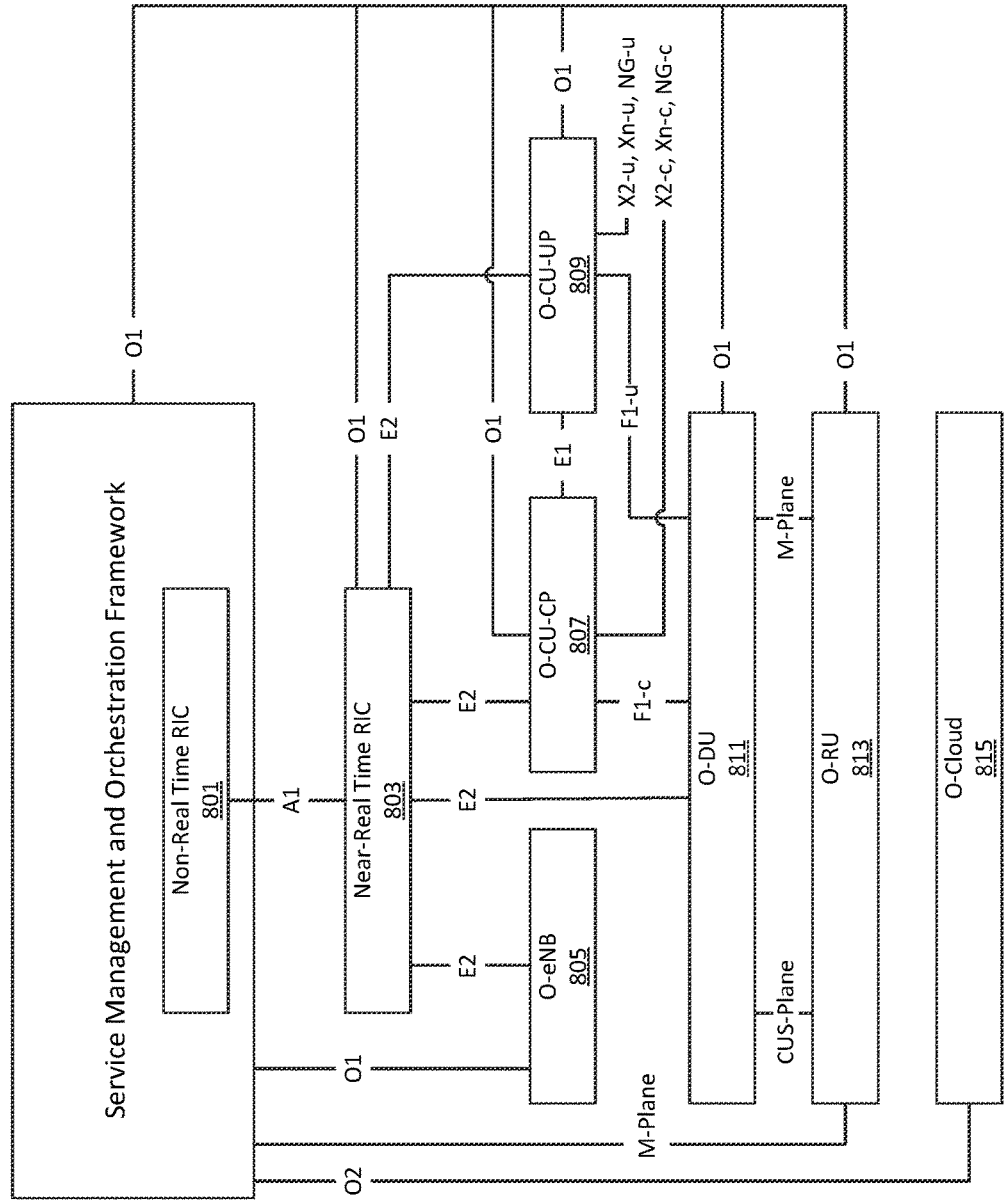
FIG. 8 illustrates an example arrangement of an Open RAN ("O-RAN") environment in which one or more embodiments, described herein, may be implemented.

FIG. 8 illustrates an example O-RAN environment 800, which may correspond to RAN 610, RAN 612, and/or DU network 700. For example, RAN 610, RAN 612, and/or DU network 700 may include one or more instances of O-RAN environment 800, and/or one or more instances of O-RAN environment 800 may implement RAN 610, RAN 612, DU network 700, and/or some portion thereof. As shown, O-RAN environment 800 may include Non-Real Time Radio Intelligent Controller ("RIC") 801, Near-Real Time RIC 803, O-eNB 805, O-CU-Control Plane ("O-CU-CP") 807, O-CU-User Plane ("O-CU-UP") 809, O-DU 811, O-RU 813, and O-Cloud 815. In some embodiments, O-RAN environment 800 may include additional, fewer, different, and/or differently arranged components.

In some embodiments, some or all of the elements of O-RAN environment 800 may be implemented by one or more configurable or provisionable resources, such as virtual machines, cloud computing systems, physical servers, and/or other types of configurable or provisionable resources. In some embodiments, some or all of O-RAN environment 800 may be implemented by, and/or communicatively coupled to, one or more MECs 707.

Non-Real Time RIC 801 and Near-Real Time RIC 803 may receive performance information (and/or other types of information) from one or more sources, and may configure other elements of O-RAN environment 800 based on such performance or other information. For example, Near-Real Time RIC 803 may receive performance information, via one or more E2 interfaces, from O-eNB 805, O-CU-CP 807, and/or O-CU-UP 809, and may modify parameters associated with O-eNB 805, O-CU-CP 807, and/or O-CU-UP 809 based on such performance information. Similarly, Non-Real Time RIC 801 may receive performance information associated with O-eNB 805, O-CU-CP 807, O-CU-UP 809, and/or one or more other elements of O-RAN environment 800 and may utilize machine learning and/or other higher level computing or processing to determine modifications to the configuration of O-eNB 805, O-CU-CP 807, O-CU-UP 809, and/or other elements of O-RAN environment 800. In some embodiments, Non-Real Time RIC 801 may generate machine learning models based on performance information associated with O-RAN environment 800 or other sources, and may provide such models to Near-Real Time RIC 803 for implementation.

O-eNB 805 may perform functions similar to those described above with respect to eNB 613. For example, O-eNB 805 may facilitate wireless communications between UE 601 and a core network. O-CU-CP 807 may perform control plane signaling to coordinate the aggregation and/or distribution of traffic via one or more DUs 703, which may include and/or be implemented by one or more O-DUs 811, and O-CU-UP 809 may perform the aggregation and/or distribution of traffic via such DUs 703 (e.g., O-DUs 811). O-DU 811 may be communicatively coupled to one or more RUs 701, which may include and/or may be implemented by one or more O-RUs 813. In some embodiments, O-Cloud 815 may include or be implemented by one or more MECs 707, which may provide services, and may be communicatively coupled, to O-CU-CP 807, O-CU-UP 809, O-DU 811, and/or O-RU 813 (e.g., via an O1 and/or O2 interface).

Figure 9:
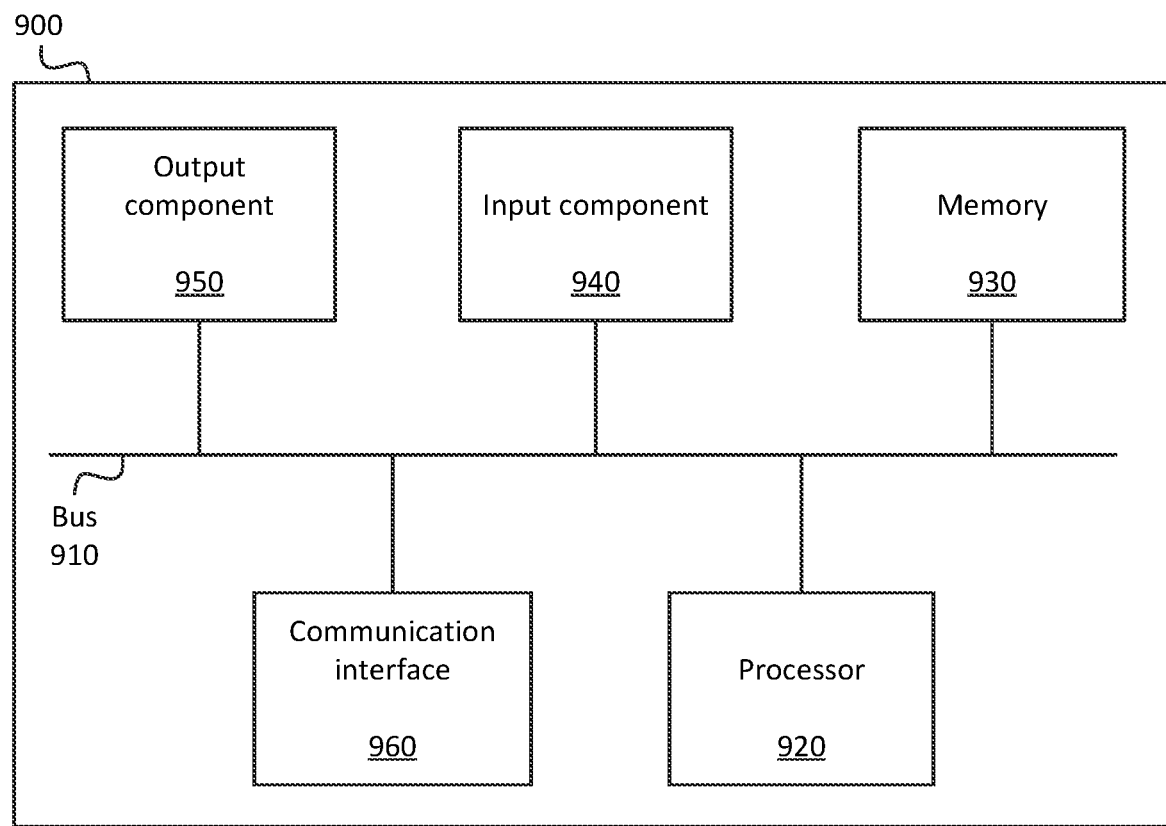
FIG. 9 illustrates example components of one or more devices, in accordance with one or more embodiments described herein.

FIG. 9 illustrates example components of device 900. One or more of the devices described above may include one or more devices 900. Device 900 may include bus 910, processor 920, memory 930, input component 940, output component 950, and communication interface 960. In another implementation, device 900 may include additional, fewer, different, or differently arranged components.

Bus 910 may include one or more communication paths that permit communication among the components of device 900. Processor 920 may include a processor, microprocessor, or processing logic that may interpret and execute instructions. Memory 930 may include any type of dynamic storage device that may store information and instructions for execution by processor 920, and/or any type of non-volatile storage device that may store information for use by processor 920.

Input component 940 may include a mechanism that permits an operator to input information to device 900 and/or other receives or detects input from a source external to 940, such as a touchpad, a touchscreen, a keyboard, a keypad, a button, a switch, a microphone or other audio input component, etc. In some embodiments, input component 940 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor. Output component 950 may include a mechanism that outputs information to the operator, such as a display, a speaker, one or more light emitting diodes ("LEDs"), etc.

Communication interface 960 may include any transceiver-like mechanism that enables device 900 to communicate with other devices and/or systems. For example, communication interface 960 may include an Ethernet interface, an optical interface, a coaxial interface, or the like. Communication interface 960 may include a wireless communication device, such as an infrared ("IR") receiver, a Bluetooth® radio, or the like. The wireless communication device may be coupled to an external device, such as a remote control, a wireless keyboard, a mobile telephone, etc.

In some embodiments, device 900 may include more than one communication interface 960. For instance, device 900 may include an optical interface and an Ethernet interface.

Device 900 may perform certain operations relating to one or more processes described above. Device 900 may perform these operations in response to processor 920 executing software instructions stored in a computer-readable medium, such as memory 930. A computer-readable medium may be defined as a non-transitory memory device. A memory device may include space within a single physical memory device or spread across multiple physical memory devices. The software instructions may be read into memory 930 from another computer-readable medium or from another device. The software instructions stored in memory 930 may cause processor 920 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-5), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising: one or more processors configured to:
   receive a request for traffic processing rules,
   identify, in response to the request, traffic to be processed by a user plane gateway device associated with a wireless network, wherein identifying the traffic includes identifying one or more parameters associated with the traffic;
   evaluate the one or more parameters based on a first set of conditions;
   identify, based on evaluating the one or more parameters based on the first set of conditions, a first condition, of the first set of conditions, that is applicable to the traffic;
   evaluate, based on identifying the first condition, the one or more parameters based on a second set of conditions;
   identify, based on evaluating the one or more parameters based on the second set of conditions, a second condition, of the second set of conditions, that is applicable to the traffic;
   identify one or more actions to perform with respect to the traffic based on the identified first and second conditions; and
   instruct the user plane gateway device to perform the one or more actions on the traffic prior to outputting the traffic from the user plane gateway device.

2. The device of claim 1, wherein the user plane gateway device includes at least one of: a User Plane Function ("UPF"), or a PDN Gateway-User Plane ("PGW-U").

3. The device of claim 1, wherein the one or more parameters include at least one of: a source associated with the traffic, a destination associated with the traffic, or a traffic type associated with the traffic.

4. The device of claim 1, wherein identifying the first condition includes identifying one or more output parameters associated with the first condition, wherein identifying the second condition is further based on the one or more output parameters associated with the first condition.

5. The device of claim 1, wherein the one or more parameters indicate a measure of network load associated with the user plane gateway device.

6. The device of claim 1, wherein evaluating the one or more parameters based on the first set of conditions includes: identifying a priority of each respective condition, of the first set of conditions, and evaluating the one or more parameters based on each respective condition, of the first set of conditions, in an order that is based on the identified priority of the each respective condition of the first set of conditions.

7. The device of claim 1, wherein evaluating the one or more parameters based on the first set of conditions includes a first iteration of evaluating a plurality of conditions, and wherein evaluating the one or more parameters based on the second set of conditions includes a subsequent second iteration of evaluating the plurality of conditions.

8. A non-transitory computer-readable medium, storing a plurality of processor-executable instructions to:
receive a request for traffic processing rules,
identify, in response to the request, traffic to be processed by a user plane gateway device associated with a wireless network, wherein identifying the traffic includes identifying one or more parameters associated with the traffic;
evaluate the one or more parameters based on a first set of conditions;
identify, based on evaluating the one or more parameters based on the first set of conditions, a first condition, of the first set of conditions, that is applicable to the traffic;
evaluate, based on identifying the first condition, the one or more parameters based on a second set of conditions;
identify, based on evaluating the one or more parameters based on the second set of conditions, a second condition, of the second set of conditions, that is applicable to the traffic;
identify one or more actions to perform with respect to the traffic based on the identified first and second conditions; and
instruct the user plane gateway device to perform the one or more actions on the traffic prior to outputting the traffic from the user plane gateway device.

9. The non-transitory computer-readable medium of claim 8, wherein the user plane gateway device includes at least one of: a User Plane Function ("UPF"), or a PDN Gateway-User Plane ("PGW-U").

10. The non-transitory computer-readable medium of claim 8, wherein the one or more parameters include at least one of: a source associated with the traffic, a destination associated with the traffic, or a traffic type associated with the traffic.

11. The non-transitory computer-readable medium of claim 8, wherein identifying the first condition includes identifying one or more output parameters associated with the first condition, wherein identifying the second condition is further based on the one or more output parameters associated with the first condition.

12. The non-transitory computer-readable medium of claim 8, wherein the one or more parameters indicate a measure of network load associated with the user plane gateway device.

13. The non-transitory computer-readable medium of claim 8, wherein evaluating the one or more parameters based on the first set of conditions includes: identifying a priority of each respective condition, of the first set of conditions, and evaluating the one or more parameters based on each respective condition, of the first set of conditions, in an order that is based on the identified priority of the each respective condition of the first set of conditions.

14. The non-transitory computer-readable medium of claim 8, wherein evaluating the one or more parameters based on the first set of conditions includes a first iteration of evaluating a plurality of conditions, and wherein evaluating the one or more parameters based on the second set of conditions includes a subsequent second iteration of evaluating the plurality of conditions.

15. A method, comprising:
receiving a request for traffic processing rules,
identifying, in response to the request, traffic to be processed by a user plane gateway device associated with a wireless network, wherein identifying the traffic includes identifying one or more parameters associated with the traffic;
evaluating the one or more parameters based on a first set of conditions;
identifying, based on evaluating the one or more parameters based on the first set of conditions, a first condition, of the first set of conditions, that is applicable to the traffic;
evaluating, based on identifying the first condition, the one or more parameters based on a second set of conditions;
identifying, based on evaluating the one or more parameters based on the second set of conditions, a second condition, of the second set of conditions, that is applicable to the traffic;
identifying one or more actions to perform with respect to the traffic based on the identified first and second conditions; and instructing the user plane gateway device to perform the one or more actions on the traffic prior to outputting the traffic from the user plane gateway device.

16. The method of claim 15, wherein the one or more parameters include at least one of: a source associated with the traffic, a destination associated with the traffic, or a traffic type associated with the traffic.

17. The method of claim 15, wherein identifying the first condition includes identifying one or more output parameters associated with the first condition, wherein identifying the second condition is further based on the one or more output parameters associated with the first condition.

18. The method of claim 15, wherein the one or more parameters indicate a measure of network load associated with the user plane gateway device.

19. The method of claim 15, wherein evaluating the one or more parameters based on the first set of conditions includes:
identifying a priority of each respective condition, of the first set of conditions, and evaluating the one or more parameters based on each respective condition, of the first set of conditions, in an order that is based on the identified priority of the each respective condition of the first set of conditions.

20. The method of claim 15, wherein evaluating the one or more parameters based on the first set of conditions includes a first iteration of evaluating a plurality of conditions, and wherein evaluating the one or more parameters based on the second set of conditions includes a subsequent second iteration of evaluating the plurality of conditions.

\* \* \* \* \*